Oct. 25, 1966 T. P. FOLEY 3,281,039

ENDLESS MAGNETIC TAPE LOOP AND PROCESSING APPARATUS

Filed Feb. 18, 1965

INVENTOR
THOMAS P. FOLEY
BY
Douglas M. Clarkson
ATTORNEY 3,281,039

ENDLESS MAGNETIC TAPE LOOP AND PROCESSING APPARATUS

Thomas P. Foley, Huntington, N.Y., assignor to Potter Instrument Company, Inc., Plainview, N.Y., a corporation of New York Filed Feb. 18, 1965, Ser. No. 433,606
6 Claims. (Cl. 226—95)

Figure 1:
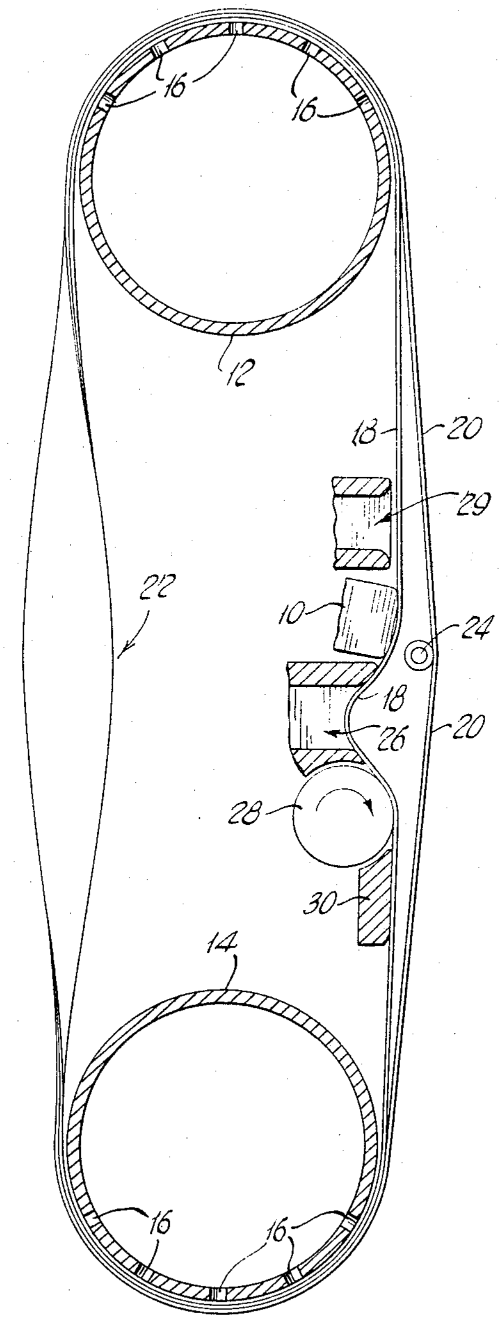

This invention, generally, relates to devices for processing information on tape, and more particularly, relates to an improved information processing device utilizing magnetic tape arranged in a particular loop arrangement to provide increased usable tape surface without related increase in size.

A random access memory device of the type for using a loop of magnetic tape as the storage media is described fully in application Serial No. 385,727 filed July 28, 1964 by Andrew Gabor and assigned to the assignee of this invention. In such a device, a length of magnetic tape is formed in a continuous loop. The loop is held in an open loop configuration by air bearing surfaces, and a magnetic head is positioned adjacent a drive capstan so that the loop is moved relative to the head for transferring digital information.

The low inertia of such loops makes such arrangements particularly applicable to computer applications where the tape loop is advanced and stopped at extremely high operational rates.

However, in such arrangements, the size of the memory is determined by the size of the loop. In order to hold the memory to convenient size, it has been necessary to restrict the loop size to a length shorter than that which could be used without considering only the mechanical and electrical problems involved.

Therefore, it is an object of the present invention to provide an improved information processing device using a magnetic tape loop in which the effective usable tape surface is increased substantially without increasing the size of the overall device.

Another object of the present invention is to provide an improved tape loop for information processing devices.

In accordance with these objects, there is provided, in a preferred embodiment of this invention, a tape loop formed by twisting a single length of tape a predetermined number of times and then bonding the ends together. The tape is of the type customarily having a magnetizable layer imposed upon a backing surface, and the loop is so twisted as to have the respective backing surfaces adjacent each other.

The loop of the invention is placed over air bearings which hold the loop in position. An information processing station, such as a magnetic head and a drive capstan are positioned between the air bearings.

A post is located adjacent the magnetic head to separate the individual sections of the loop of tape so that the inner section engages the head and the outer section passes in a path separated from the head. Due to the nature of the loop of the invention, continued movement of the tape will eventually expose the entire magnetized layer of the tape loop to the head. Thus, with the present invention, approximately twice the usual linear magnetic path is obtained without change of the dimensions of the remaining apparatus.

Figure 2:
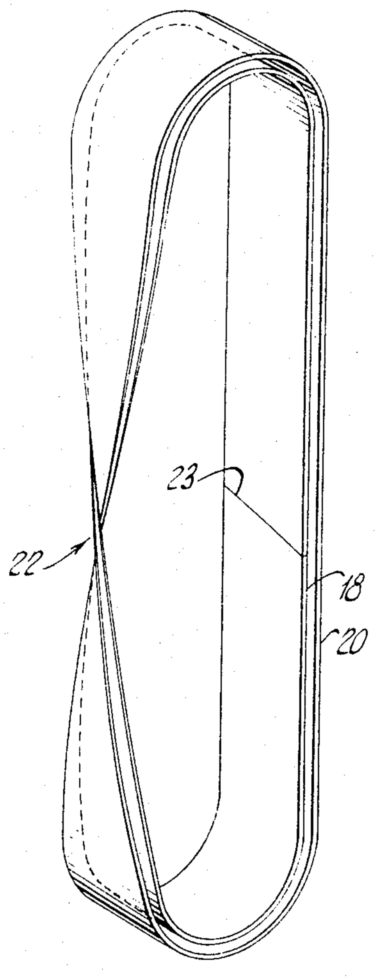

Having described this invention briefly, it will be described now in greater detail in the following detailed description, which may best be understood by reference to the accompanying drawings, in which:

FIG. 1 is a view partly in cross section of an information processing device utilizing a tape loop in accordance with the present invention; and FIG. 2 is a perspective view of the tape loop according to the present invention.

In FIG. 1, there is shown an information processing device particularly adapted for use in a random access information storage device as described in greater detail in the above referred to application and includes a read-write head 10 positioned between a first bearing assembly 12 and a second bearing assembly 14 over which the tape loop is positioned. Each bearing assembly 12 and 14 is formed of a cylinder having a plurality of apertures 16 spaced about the outer periphery. The interior of each bearing assembly 12 and 14 is supplied with air under pressure, which air escapes through the apertures 16 to provide air cushions separating the tape loop from the surface of the bearings and, thus, providing an air bearing of low frictional resistance.

The tape loop arrangement of the present invention consists of a continuous, compound loop of tape having a first section 18 within a second section 20 in the vicinity of the head 10, with the backing surfaces adjacent each other, formed by making a 720° twist in a single length of tape and bonding the ends together.

The nested loop sections taken together develop into a full 180° twist, as shown at 22, at a point between the bearing assemblies 12 and 14 opposite the head 10, and the ends are bonded together at 23 by a suitable adhesive to form the continuous loop.

A guide post 24 is positioned adjacent the head 10 to separate the outer loop section 20 from the inner loop section 18 as the tape travel carries the tape past the head 10. A combined guide assembly and vacuum chamber 26 is provided to bring the tape section 18 into contact with a continuously rotating capstan 28 and also into contact with the read-write head 10.

A tape guide 30 is positioned adjacent the capstan 28 for keeping the magnetic tape out of contact with the capstan 28 when vacuum on the chamber is removed and pulled on another, similar chamber 29 located on the opposite side of the head 10. Tape motion is started and stopped by transferring vacuum between the two chambers 28 and 29.

With the composite tape loop formed as described, continued movement of the composite tape loop past the read-write head 10 will, in due course, cause each segment of the magnetizable layer of both loop sections 18 and 20 to pass the read-write head 10 in sequence. The post 24, however, separates the inner, then active tape loop section 18 from the outer, then inactive tape loop section 20 so that interference is not encountered between the magnetized layers on the surfaces of the adjacent loops.

Thus, the tape loop passing the read-write head is a single magnetizable layer without any interference with the adjacent layer. However, in physical configuration, the strips are formed into a composite loop so that continued movement will expose sequentially the entire magnetizable length on the both of the individual loop sections 18 and 20 in sequence.

For this reason, a random access information storage device, as described in the previously referred-to application, utilizing the loop shown specifically in FIG. 2 has available about twice the length of tape for information storage without changing the overall size of the device or the distance between the bearing assemblies 12 and 14.

Although this invention has been described with particular reference to magnetic tape because of the ease of distinguishing the back (the supporting surface) from the active front (the magnetizable layer), it will be apparent that the invention is applicable to elongated webs of different form, as, for example, perforated tape. The positioning of the web used in back-to-back orientation and arranging the composite loop in the configuration described, ensures that the face side (and only the face side) of each web is read by continued advancing movement.

At now conventional operational speed and with now conventional web materials, the twist of the composite loop is maintained with smooth transition and without sharp bends. It has been found that tape guides are not required to maintain the smooth transition.

This invention may be variously modified and embodied within the scope of the subjoined claims.

What is claimed is:

1. In a random access information storage device, the combination comprising:

a first tape bearing means, a second tape bearing means spaced from the first tape bearing means by a predetermined distance, a composite loop supportably engaged by the first and second bearing means, an information processing station positioned between the first and second bearing means, a tape drive mechanism to move the composite loop past the information processing station, and the composite loop comprising first and second loop sections in back-to-back contact formed of a continuous strip with ends joined and having a 180° twist in composite loop when they are disposed in the assembled configuration.

2. In a device as set forth in claim 1 which includes means to separate the first and second loop sections in the vicinity of the information processing station so that only one loop section is in information transferring relationship with the station.

3. In a device as set forth in claim 1 which includes a vacuum chamber positioned adjacent information processing station, the vacuum chamber being adapted to hold one of the loop sections in information processing relationship with the station.

4. A device in accordance with claim 1 in which the drive mechanism comprises a selectively rotatable capstan and a tape guard positioned adjacent thereto.

5. A device in accordance with claim 1 in which each of said bearings comprises a cylindrical shell having perforations extending from the interior to the exterior thereof, means for supplying air to said shells with exits through said apertures to provide an air cushion between said shell and the loop sections supported thereby.

6. A composite loop of information carrying tape for use in an information processing apparatus comprising:

a single strip of tape having a predetermined length and formed of a material adaptable for storage of information, said strip of tape having a 720° twist and having its ends attached together, and said strip of twisted tape with its ends attached together being looped over itself to form two nested loop sections having a 180° twist.

References Cited by the Examiner

UNITED STATES PATENTS

| | | | |
|---|---|---|---|
| 1,840,323 | 1/1932 | Leeming | 274—11 |
| 2,883,475 | 4/1959 | Ridler | 226—97 X |
| 3,110,431 | 11/1963 | Potter | 226—95 |
| 3,221,963 | 12/1965 | Andersen | 226—109 |
| 3,240,441 | 3/1966 | Hunter | 226—196 X |

M. HENSON WOOD, Jr., *Primary Examiner.*

R. A. SCHACHER, *Assistant Examiner.*